United States Patent [19]

Chappellier

[11] 3,951,109
[45] Apr. 20, 1976

[54] ROTARY INTERNAL COMBUSTION ENGINE

[76] Inventor: Robert A. Chappellier, 22 E. 80th St., New York, N.Y. 10021

[22] Filed: Dec. 6, 1974

[21] Appl. No.: 530,178

[52] U.S. Cl............................ 123/8.23; 123/8.35
[51] Int. Cl.² .................................. F02B 53/08
[58] Field of Search................ 123/8.23, 8.41, 8.17, 123/8.35; 418/184, 268

[56] References Cited
UNITED STATES PATENTS

| | | | |
|---|---|---|---|
| 874,616 | 12/1907 | Oakman | 123/8.23 |
| 1,605,912 | 11/1926 | Barker | 123/8.23 |
| 1,790,256 | 1/1931 | Wright | 123/8.17 |
| 1,877,250 | 9/1932 | Meyer | 123/8.41 |
| 2,104,517 | 1/1938 | Heerde | 123/8.41 |
| 3,884,196 | 5/1975 | Grob | 123/8.41 |
| 3,902,465 | 9/1975 | Stookey | 123/8.17 |

Primary Examiner—Carlton R. Croyle
Assistant Examiner—O. T. Sessions
Attorney, Agent, or Firm—Eldon H. Luther

[57] ABSTRACT

A rotary internal combustion engine with the rotor having separate power and compressor sections in side-by-side relation secured to the same shaft so that they rotate together and are separated by a separating plate. These sections have, at their outer periphery, members that move laterally into engagement with the wall of the stator within which the rotor rotates. The separating plate rotates with the rotor sections and has an opening through which a compressed gas charge is conveyed from the compressor section into the power section.

12 Claims, 7 Drawing Figures

ROTARY INTERNAL COMBUSTION ENGINE

BACKGROUND OF THE INVENTION

In rotary internal combustion enginges of the type that have a rotor that is divided into a compressor section and a power section that are in side-by-side relation, mounted on the same shaft and rotated together, it is desirable to have the compressed gas charge moved from the compressor section into the expansion pocket of the power rotor section in as expedient a manner as possible. It is further desirable that the expansion pocket be so constructive and arranged as to provide maximum moment as a result of rapid burning of the charge therein. In prior art devices of this type, the compressed gas charge often travels through a rather long path to the expansion pocket or there may be a substantial portion of this path or passage wherein this compressed gas charge is not effective to provide a moment for imparting rotation to the rotor. In the present invention, there is a very close working relation and communication between the working members of the rotary engine. The compressed gas charge is completely discharged from the compression section of the rotor laterally through an opening in the relatively thin separating plate and into the expansion pocket that is formed in the rotor power section. This expansion pocket is formed in a pivotal wing member, the outer extremity of which is in engagement with the inner peripheral wall of the stator of the rotary engine. This wing pivots outward into the expansion chamber formed between the rotor periphery and the inner periphery or peripheral wall of the stator, whereby maximum moment is applied during this expansion function.

BRIEF DESCRIPTION OF THE INVENTION

In accordance with the invention, there is provided a stator within which is housed a rotor member, which is secured to a suitable shaft that is journaled to the end plates or heads of the stator. The rotor is divided into at least one compressor section and one power section, with there being two of each such sections in the preferred illustrative embodiment. These sections (i.e. compressor and power) are separated by means of a relatively thin separating plate that rotates with and forms a part of the rotor and is received in a complimentary annular recess in the stator in a manner to effectively seal the adjacent compressor and power compartments from each other. Each of the rotor sections is provided with members that move laterally outward of what may be termed the periphery of the rotor into engagement with the inner peripheral wall of the stator, and the arrangement is such that upon rotation of the rotor gas or a gas and fuel mixture is drawn into the compressor section and compressed and forced laterally through an opening in the separating plate into a suitable expansion pocket formed in one of the laterally movable members of the power rotor section. This gas charge is then fired in this pocket, and during continuing rotation of the rotor the charge burns rapidly in an expansion chamber as the laterally movable member moves outward from the main periphery of the power rotor section to provide for maximum moment to rotate the rotor.

Figure 1:
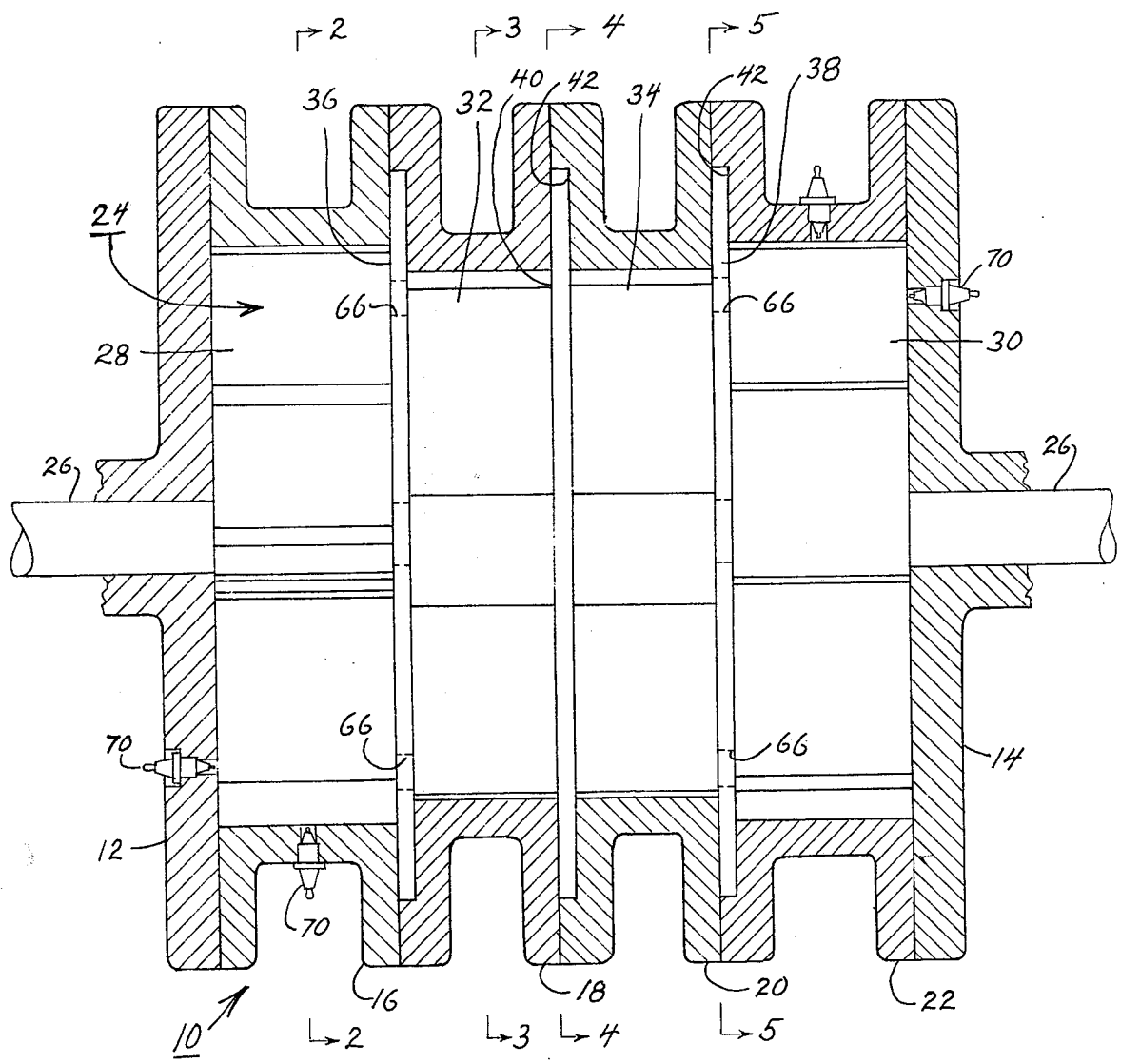
FIG. 1 is in the nature of a vertical section through the stator portion of the rotary enginge of the invention with the portions of the engine located within the stator being shown in elevation.

Referring now to the drawings, wherein like reference characters are used throughout to designate like elements, the illustrative embodiment of the invention as depicted therein comprises a rotary internal combustion engine that has a stator designated generally 10 and which includes the cylinder heads or end plates 12 and 14, which are maintained in spaced relation by means of the four cylinders or cylindrical members 16, 18, 20 and 22. These cylinder heads and cylinders have complimentary flanges as shown and the stator is secured together by means of bolts or the like (not shown) associated with these flanges.

Positioned within the stator 10 is a suitable rotor designated generally 24. The rotor is journaled to the cylinder heads 12 and 14 of the stator, and for this purpose there is provided the shaft 26 which supports the rotor within the stator and about the axis of which the rotor rotates. The rotor 24 is made up of a number of sections that rotate together and it includes the power sections 28 and 30 and the compressor sections 32 and 34. The power section 28 and the compressor section 32 form one operative pair while the power section 30 and compressor section 34 form a second operative pair, with each pair being effective to provide the intake, compression, expansion and exhaust functions conventionally found in the operation of engines of this type. These various rotor sections are all secured together so that they rotate in unison and the compressor section 32 is separated from the rotor section 28 by means of the separating plate 36, while the compressor section 34 is separated from the power section 30 by means of the separating plate 38. The two compressor sections 32 and 34, are separated by means of the separating plate 40. All of these separating plates also form a part of the rotor and rotate in unison with the various rotor sections and each of these plates is received in a complementary recess 42 in the stator. Suitable sealing means (not shown) are provided for each of these separating plates and its associated recess to effectively seal from each other the compartments on each side of the plates.

Figure 2:
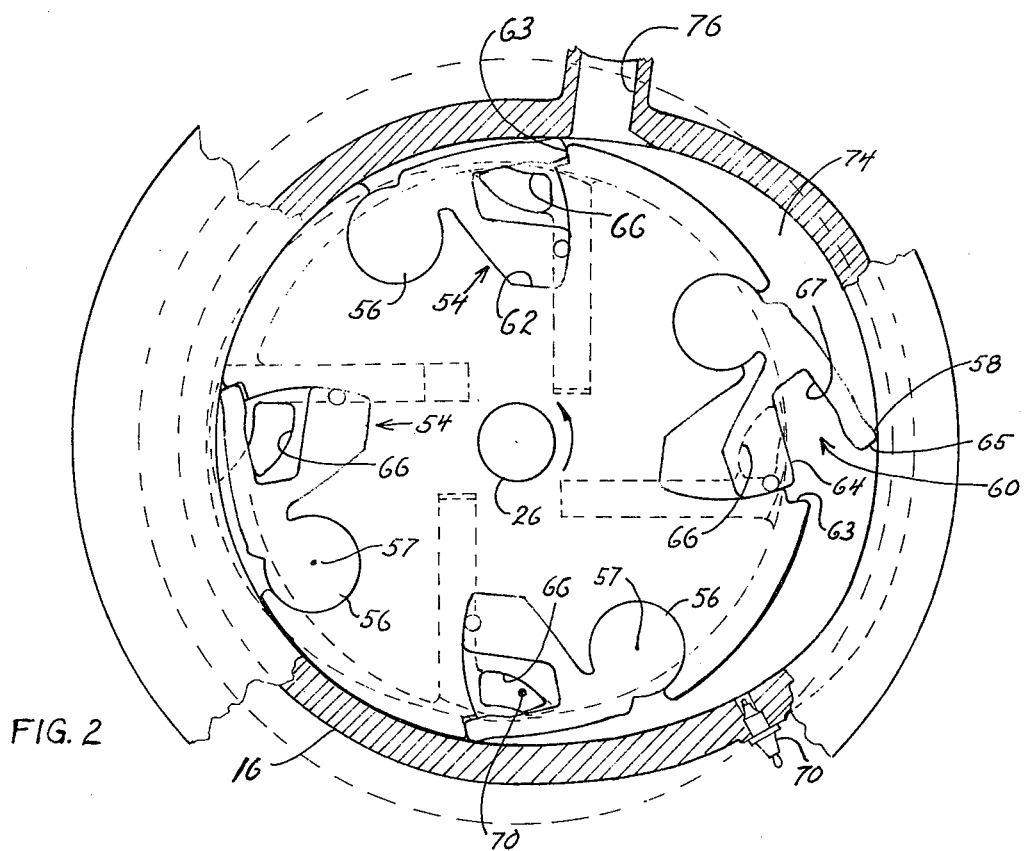
FIG. 2 is a view with the left head or end wall of the stator (FIG. 1) removed and with portions shown in section. This view may generally be said to be taken along line 2—2 of FIG. 1 with the rotor portions being shown in elevation rather than in section.
Figure 3:
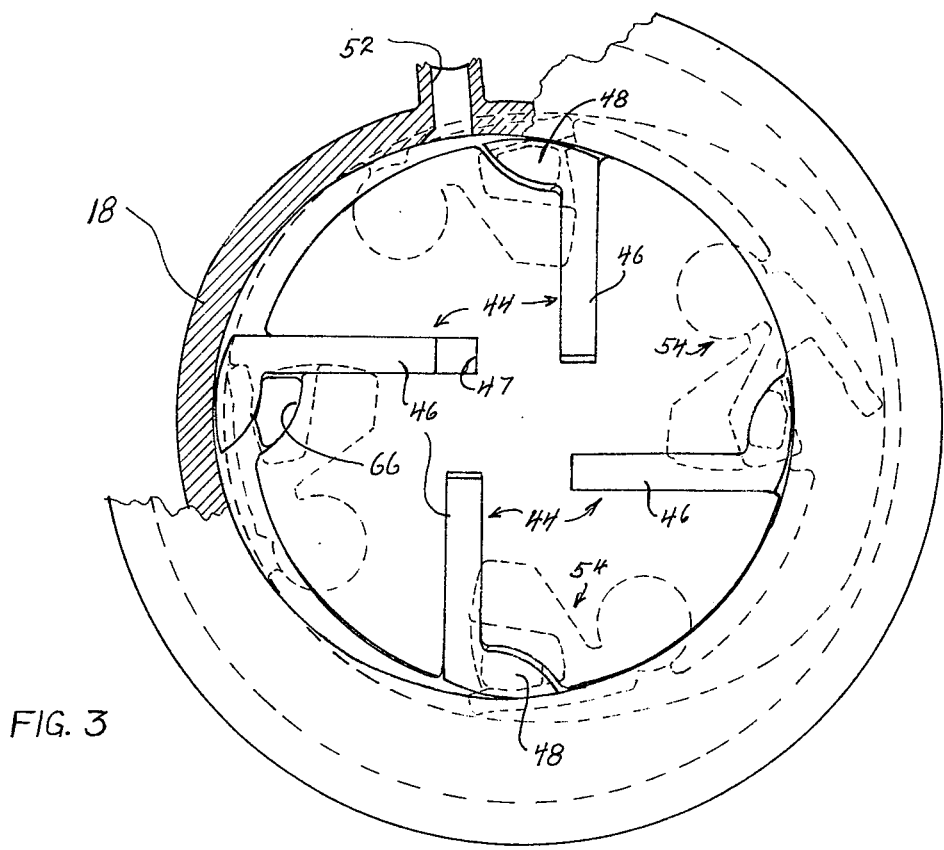
FIG. 3 is a similar view taken generally along line 3—3 of FIG. 1.

In the illustrative embodiment, the chambers of the stator, within which the respective compressor and power rotor sections are disposed, are eccentric with respect to the axis of rotation of the rotor. The eccentricity of the chamber within which power section 38 is mounted is best shown in FIG. 2, while the eccentricity of the chamber within which compressor section 32 is mounted is best shown in FIG. 3. Similarly, the configuration of the chambers within which compressor section 34 and power section 30 are mounted are well shown in FIGS. 4 and 5, respectively. Since the rotors are concentric with respect to their axis of rotation there is formed intermediate the periphery of the compressor section and the inner wall of the stator the compression chamber 50 and intermediate the periphery of the power section and the inner wall of the stator the power chamber 74.

Each of the compressor sections, 32 and 34, includes a plurality of vanes 44 (there being four illustrated) that are laterally movable with respect to the compressor rotor section proper. The vanes include a shank portion 46 that is received in a complimentary recess 47 formed in the compressor rotor section proper. This shank portion has formed on its outer end a head portion 48 that is in engagement with the inner peripheral wall of the stator throughout the full rotative extent of the rotor. The location of this engagement (which may be a line contact) is displaced somewhat rearwardly from the forward end of this head portion with respect to the direction of rotation but well forwardly of shank portion 46. The purpose of this arrangement is so that the compressed gas developed in the pocket 50, incident to the operation of the engine, is effective to bias the vane to its lateral outward position. This action together with the centrifugal force which continuously biases the vanes outward is effective to provide for satisfactory sealing engagement of the vanes with the inner peripheral wall of the stator during the operation of the compressor sections. If desired, springs may also be used to assist in biasing the vanes outwardly, but they are not necessary. Air or a mixture of air and fuel is drawn into the compression chambers 50 through the intake opening 52 associated with each of the compressor sections.

Figures 6, 7:
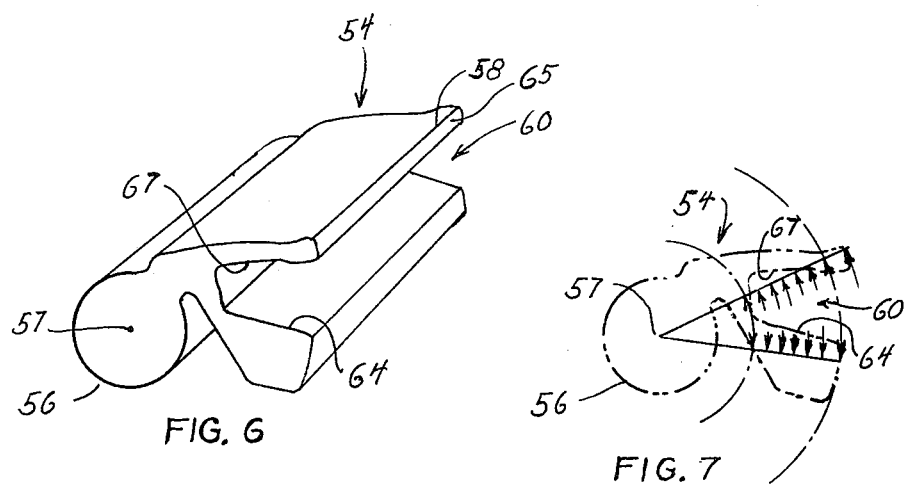
FIG. 6 is a view in the nature of a perspective of the pivotal wing, per se.
FIG. 7 is a diagram illustrating the unbalanced force produced by the compressed gas charge in the pocket in the wing.

Each of the power sections 28 and 30 has mounted in the outer region thereof the pivotal wing members 54. These wing members are equal in number to the vanes in the compressor section and are disposed with relation to the vanes as illustrated and for the purpose to be described. Each of the wing members includes a forward cylindrical portion 56 that is mounted in a complimentary cylindrical recess formed in the power rotor section proper, such that the wing is secured in the power section but is free to pivot about the axis of this cylindrical portion 56. The rearward portion of each of the wings is formed as illustrated with the rearwardmost outer region 58 engaging the inner peripheral wall of the stator, and with this rearward wing portion being provided with recess or pocket 60. This rearward wing portion is received in a complimentary recess 62 formed in the periphery of the power rotor section proper, and the wing pivots about the axis 57 between its innermost lateral position shown at the left of FIG. 2 and its outermost lateral position shown at the right in FIG. 2. It will be noted that the outer wall 67 of recess 60 has a greater dimension or, in other words, is longer than the inner wall 64 (FIG. 2) thereby providing a greater outer wall area so that the compressed gas charge, which is received in the recess 60 is effective to provide a resulting force that biases the wing outwardly against the inner peripheral wall of the stator. In this connection it will be noted that the rear outer extermity of the wing member 54 is received in a relieved portion or step 63 when the wing member is in its extreme inward position but does not fully seat in this step permitting the pressurized gas within pocket 60 to act over the entire surface of wall 63. The rearward face 65 of the wing cooperates with the complimentary surface of this step 63 to substantially prevent fluid leakage therebetween. FIG. 7 diagramatically illustrates the unbalanced forced produced by the compressed gas charge in recess 60.

Figure 4:
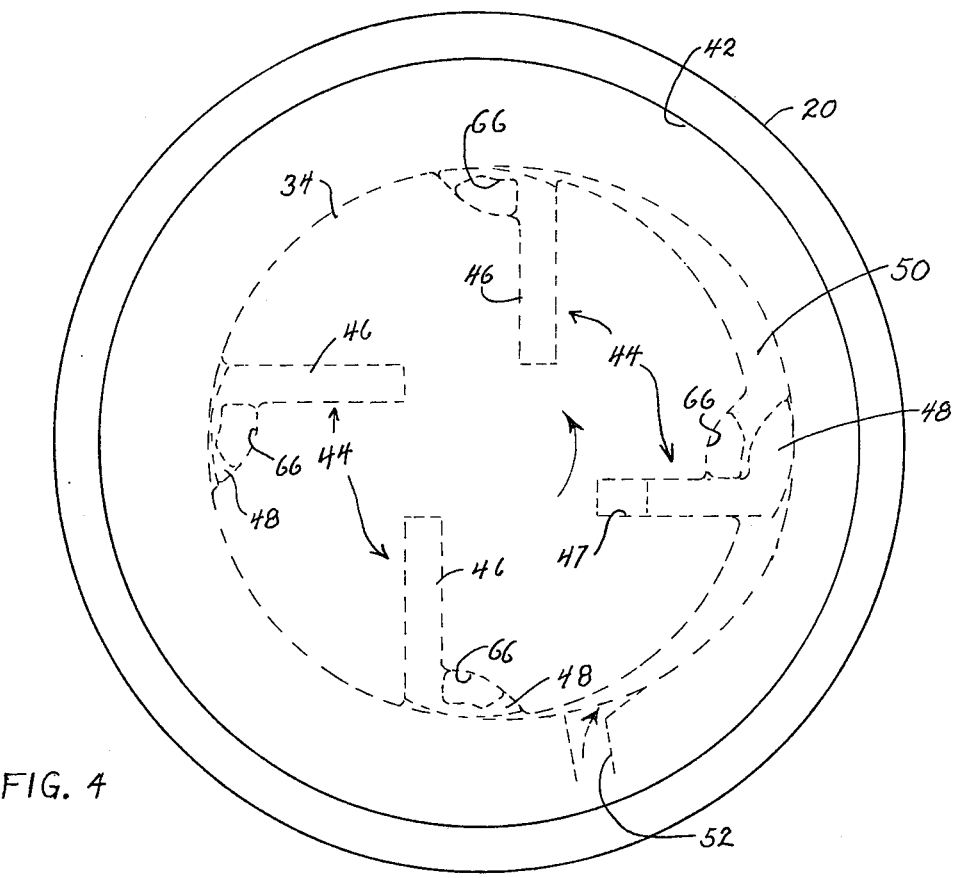
FIG. 4 is a similar view taken generally along line 4—4 of FIG. 1.
Figure 5:
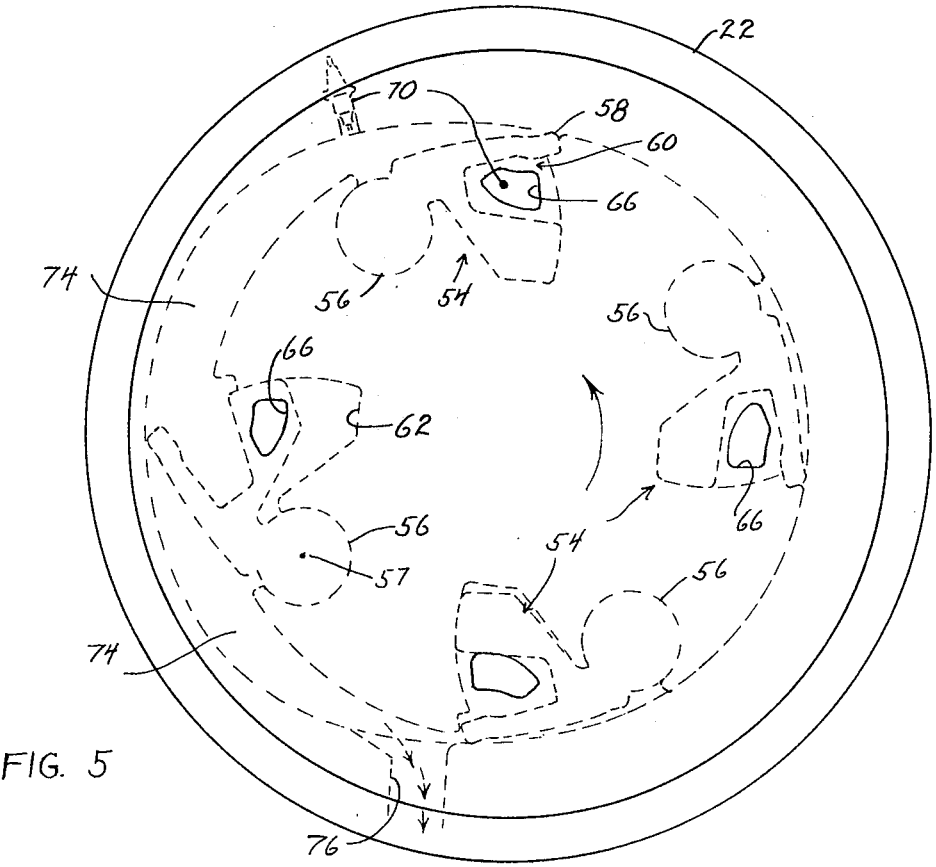
FIG. 5 is a similar view taken generally along line 5—5 of FIG. 1.

Communication is established between the compressor rotor section and the power rotor sections of each pair of sections through openings 66 provided in the separating plates 36 and 38. The openings 66 are so positioned, as are the vanes and wings, so that during the compression function the vane is effective to force the compressed gas charge through the opening 66 into the recess 60 of the wing. This is perhaps best illustrated in FIGS. 4 and 5. In FIG. 4 the topmost vane 46 is in its innermost position having just completed the compression cycle thereby having forced the compressed gas charge through the opening 66 and into the recess 60 of the wing 54. In FIG. 5 the topmost wing is in the position it will occupy when the topmost vane in FIG. 4 is as illustrated. Accordingly, these elements are very closely coupled and the compressed gas charge is required only to pass through the opening 66 into the compression pocket where it will be fired by means of suitable firing devices such as spark plugs 70. While the compression function is taking place, through one half revolution of the rotor in the illustrative embodiment, the cooperating wing is held to its innermost position through contact with the stator peripheral wall thus allowing transfer of gases through opening 66 during compression from the compression compartment to the wing pocket or recess. The forwardly extending portion of the vane is instrumental in moving the gases radially inward and into the pockets of the pivoting members of the power section. At completion of compression or radially inward motion of the vanes, substantially no dead space is left in the compressor section.

As shown there may be two firing devices for each of the power rotor sections, and they may be circumferentially spaced. One such device may be activated upon receipt of the complete compression charge in the pocket 60. This may be mounted in the head or end plate of the stator and as for example in the FIGS. 2 and 5 illustrations, this device may be fired at the location of the dot 72. The second device may be mounted in the cylinder wall as shown in FIG. 1 and may be circumferentially spaced in the direction of rotation of the rotor as indicated in FIGS. 2 and 5.

It will be appreciated that the vanes and the wings extend throughout the width of the stator chambers in which they are mounted and engage the peripheral wall thereof to provide a seal with respect thereto, with suitable sealing means, as is known in the art being provided for this purpose. Suitable sealing means is also provided intermediate the power rotor sections 28 and 30 and their associated cylinder heads.

The orientation of the compressor and power rotor sections 32 and 28 is 180 degrees removed with respect to the compressor and power sections 34 and 30, in order that the firing locations will be 180° apart and thereby provide for a balanced firing arrangement.

In operation, as the compressor sections 32 and 34 are rotated in the direction indicated by the arrows in the various drawing views, the vanes 44 as they move through the compression chamber 50 are effective to suck a gas supply in behind them through the intake 52 and compress the gas charge in front of them. This action takes place through one half of a full rotation of the rotor. The compressed gas charge is forced through the opening 66 into a pocket 60 of a wing in the power rotor section. This charge is fired in this pocket and as the rotor rotates, the wing moves through the expansion chamber 74 and moves radially outward to a position where substantially the entire pocket 60 is displaced laterally outward from the main portion of the power rotor section whereby the action of the rapidly burning expanding gases is effective to provide maximum moment for rotation of the rotor. The spent charge in front of the wing is exhausted through the exhaust port 76 which communicates with the expansion chamber 74.

It will be appreciated that this entire action takes place with there being no valves, cam operating members, or the like and with the gas transport requirements being maintained at a minimum. It will be further appreciated that the relative movement between the gas masses and the walls of the chambers within which they are contained is maintained at a low value, with two of the walls that make up the expansion chamber and three of the walls that make up the compression chamber moving with the gas so that there is no relative movement between these walls and the gas.

It is accordingly submitted that the present invention provides an extremely simple and highly efficient rotary engine organization.

What is claimed is:

1. A rotary internal combustion engine comprising in combination
    a. a stator adapted to receive therein rotor means and having an inner peripheral wall,
    b. rotor means rotatably mounted within said stator and having
        1. a compressor section forming with the inner peripheral wall of the stator a compression chamber that extends a substantial distance along said peripheral wall, said compressor section having circumferentially spaced vane members that rotate therewith but move laterally with respect to the axis of rotation to cooperate with the peripheral wall region of the stator to affect a compression action incident to rotation of the rotor means,
        2. a power section positioned side of said compression section and forming with the inner peripheral wall of the stator an expansion chamber which is angularly displaced from said compression chamber, said power section including members that have gas receiving pockets at their rear region with respect to rotation of the rotor means and that are laterally movable with respect to the axis of rotation so that they may engage and follow the inner peripheral wall surface of the stator throughout the rotation of the power section including traversal of the expansion chamber,
        3. a division wall sandwiched between and separating the compressor and power sections and mounted for rotation therewith, said division wall being sealingly received in a complimentary recess in said stator, the compressor section and the power section having the same number of vanes and members respectively positioned at corresponding angular locations and said division wall having an opening extending therethrough at each of said locations and so disposed as to convey a compressed gas charge from the compressor section directly into the pocket formed in the respective member of the power section whereby the compressed gas charge moves a minimum distance in its travel from the compressor section to the power section, and
    c. means for admitting gas to said compression chamber and means for exhausting gas from said expansion chamber.

2. The rotary internal combustion engine of claim 1 wherein the laterally movable members that form a part of the power section are pivotally mounted in the power section of the rotor at the forward end of the members with respect to the direction of rotation of the rotor and wherein the rearwardly opening pocket is provided with a surface arrangement so that the resultant force produced by a compressed gas charge in this pocket and the rapid burning of this charge is such as to cause the member to pivot outwardly to force the contacting region of the wing member against the inner peripheral wall of the stator.

3. The rotary internal combustion engine of claim 1 wherein the laterally movable members that form a part of the power section are pivotally mounted in the power section of the rotor at the forward end of the members with respect to the direction of rotation of the rotor and wherein the rearwardly opening pocket is of such shape and geometry that the distance from the pivot mount axis to the location of engagement with the stator is greater than the distance from the pivot mount axis to the radially inward location of sealing thereby causing a net moment radially outward due to the pressure of compressed gases.

4. The rotary internal combustion engine of claim 2 wherein the pivotal member engages the inner wall of the stator at the rearmost outer region of the member with respect to rotation of the rotor means and wherein the dimension of the outer wall of the pocket formed in this member is such as to provide a greater wall area than the inner wall to provide the laterally outward directed resultant force.

5. A rotary internal combustion engine as defined in claim 1 wherein the laterally movable vanes of the compressor section have a forwardly extending portion at the outer end thereof which is effective, incident to a build-up of pressure therebeneath, to cause a resultant outwardly directed force on the vane tending to provide a better seal during the compression function.

6. A rotary internal combustion engine as defined in claim 1 wherein the rotor means includes a second compressor section co-axially with and next to the first mentioned compressor section on the other side thereof with an additional power section located similarly with respect to this second compressor section whereby there are a pair of power sections inbetween which are disposed a pair of compressor sections all of which are mounted on a common shaft in the stator, the angular orientation of this second pair of compressor-power sections being 180° with respect to the first mentioned sections whereby a balanced firing will be obtained.

7. An engine of the type described including:
    a. rotor means;
    b. stator means having an inner peripheral wall;
    c. means supporting the rotor for rotation about a predetermined axis within the stator means and in a predetermined direction;

d. said rotor means having a generally cylindrical compressor section and a generally cylindrical power section in closed spaced side-by-side coaxial relation;

e. the inner peripheral wall of the stator being eccentric with respect to said axis of rotation and forming with said compressor and power sections, respectively, a generally crescent shaped compression and expansion chamber, said chambers being angularly offset from each other;

f. intake and exhaust means communicating with said compression and expansion chambers respectively;

g. means preventing uncontrolled communication between the region intermediate the two rotor sections and the inner periphery of the stator, this means including an annulus rotating with and extending radially beyond said sections and sealingly received in a complimentary recess in the stator wall, this means having a plurality of openings therein inward of the radial extremity of said sections and symmetrically, angularly spaced;

h. wing members mounted on said power rotor section at the outer region thereof and at the location of said openings, each of said wing members pivoting at its forward end relative to the direction of rotor about an axis parallel with said axis of rotation to and from an inner position where it is contained essentially within a complimentary recess in the power section and an outer position, the rearward region of the wing member sealingly engaging the inner peripheral wall of the stator throughout the rotation of the rotor, each wing member having a recess at its rear region for receiving a compressed gas charge, said recess communicating with the associated opening;

i. vane members mounted on said compressor section at the location of said openings, each of said vane members being movable laterally of said axis of rotation to and from an inner position where it is contained essentially within a complimentary recess in the compressor section and an outer position, the outermost region of the vane member sealingly engaging the inner peripheral wall of the stator throughout the rotation of the rotor, each of said vane members being positioned relative to the associated opening to force a compressed gas charge therethrough upon traversal of the compression chamber;

j. and means for firing a combustible charge in the recess of the wings.

8. The engine of claim 7 wherein the recess in each of the wings has an outer wall of greater area than the inner wall to provide an outward resultant force from pressurized gas in said recess.

9. The engine of claim 7 wherein each of the vanes includes a shank portion slidingly received within a complimentary passageway in the compressor section and a head portion extending forwardly of said shank and also received in a complimentary recess in the compressor section adjacent the periphery thereof, said opening associated with the vane opening into this recess, said vane engaging the stator wall at a location on the outer region of said head portion forwardly of the shank portion.

10. The engine of claim 7 wherein the rotor includes two pairs of coaxial power rotor portions and compressor rotor portions mounted for rotation in unison within said stator with the two compressor portions being in closely spaced side-by-side relation spaced by a separating plate.

11. A rotary internal combustion engine having intake and exhaust means and a rotor mounted for rotation about a predetermined axis, said rotor being of split construction with power and compression portions in side-by-side closely spaced relation along said axis of rotation, said portions being separated by a relatively thin sealing plate movable with and forming part of said rotor, stator means housing said rotor, means including movable members carried by the compression portion effective in cooperation with the stator to produce a compressed gas charge incident to rotation of the rotor, passageway means in said sealing plate to convey said charge to a region of said power portion, means including movable members carried by the power portion to receive said charge from said passageway means and cooperating with the stator to produce a power function, this last named means having a recess therein to receive said charge, said recess occupying a radial inner position to receive the charge and a radial outer position during the power function, and means to fire a combustible mixture in said recess.

12. The rotary internal combustion engine of claim 11 wherein the recess in the movable members in the power portion have a greater outwardly directed wall area than inwardly directed wall area.

* * * * *